United States Patent [19]
Claesson

[11] Patent Number: 5,031,083
[45] Date of Patent: Jul. 9, 1991

[54] ARRANGEMENT FOR OPEN PROFILE LENGTHS

[76] Inventor: Hans Claesson, Meggen, Switzerland

[21] Appl. No.: 438,418

[22] PCT Filed: Jun. 15, 1988

[86] PCT No.: PCT/SE88/00324
§ 371 Date: Nov. 20, 1989
§ 102(e) Date: Nov. 20, 1989

[87] PCT Pub. No.: WO88/10396
PCT Pub. Date: Dec. 29, 1988

[30] Foreign Application Priority Data
Jun. 26, 1987 [SE] Sweden ................................ 8702652

[51] Int. Cl.$^5$ ........................... F21V 21/00; F21S 3/00
[52] U.S. Cl. ........................... 362/249; 362/225;
362/800; 52/731; 52/732
[58] Field of Search ............... 362/217, 219, 225, 249,
362/391, 800; 52/220, 221, 731, 732

[56] References Cited
U.S. PATENT DOCUMENTS

| | | | |
|---|---|---|---|
| 3,081,851 | 3/1963 | Hubbard | 52/732 X |
| 3,222,841 | 12/1965 | Lipof | 52/731 |
| 3,297,075 | 1/1967 | Howell et al. | 362/219 |
| 3,332,197 | 7/1967 | Hinkle | 52/732 X |
| 3,596,427 | 8/1971 | Bayamon et al. | 248/357 X |
| 3,792,250 | 2/1974 | Kilbourn et al. | 362/249 X |
| 3,934,105 | 1/1976 | Lockard | 362/800 X |
| 4,554,619 | 11/1985 | Bansbach et al. | 362/225 X |
| 4,654,765 | 3/1987 | Lardman | 362/219 X |

Primary Examiner—Ira S. Lazarus
Assistant Examiner—Peggy A. Neils
Attorney, Agent, or Firm—Dvorak and Traub

[57] ABSTRACT

An arrangement for open profile lengths intended to permit them to be connected together to produce a channel structure which is closed around its periphery. Profile lengths of identical execution are connected together to produce a closed channel structure. Two profile lengths of identical execution, each of which has its own flange with the desired external form and a number of connecting elements projecting from a common base are so arranged, with their channel-shaped spaces facing towards one another, as to be connected together through the interaction between the flanges and connecting elements.

5 Claims, 3 Drawing Sheets

ARRANGEMENT FOR OPEN PROFILE LENGTHS

The present invention relates to an arrangement for open profile lengths intended to permit these to be connected together to produce a channel structure which is closed around its periphery.

The principal object of the present invention is, in the first place, to make available an arrangement of the kind referred to above, which, amongst other things, permits profile lengths of identical execution to be connected together to form a closed channel structure which lends itself to use in lighting applications, for example, without the need for the production and storage of profile lengths of different kinds, and which also lends itself to being executed with a desired external form.

Said object is achieved by means of an arrangement in accordance with the present invention, which is characterized essentially in that two profile lengths of mutually identical execution, each of which has its own flange with the desired external form and a number of connecting elements projecting from a common base, are so arranged, with their channel-shaped spaces facing towards one another, as to be connected together through the interaction between said flanges and connecting elements.

The invention is described below as a preferred illustrative embodiment, in conjunction with which reference is made to the drawings, in which FIG. 1 shows a perspective view of a profile length in accordance with the present invention, viewed at an angle from below;

Figure 1:
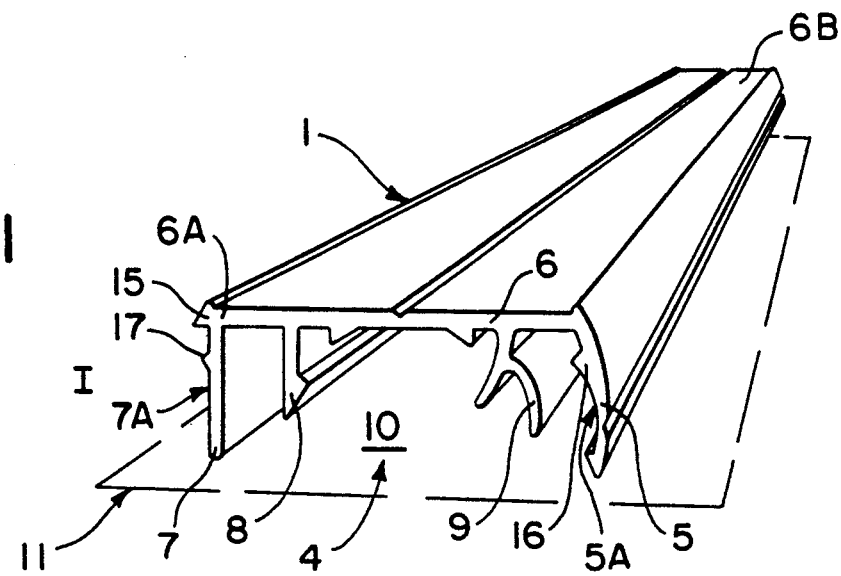
Figure 2:
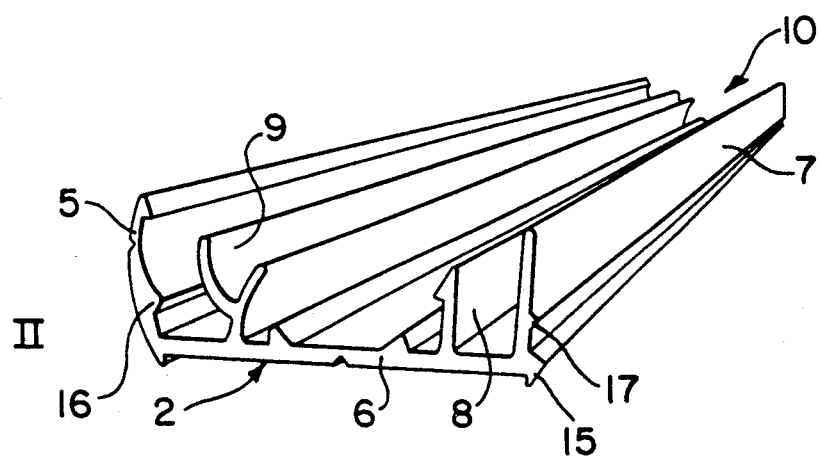
FIG. 2 shows a perspective view of a upturned profile length, viewed at an angle from above.
Figure 3:
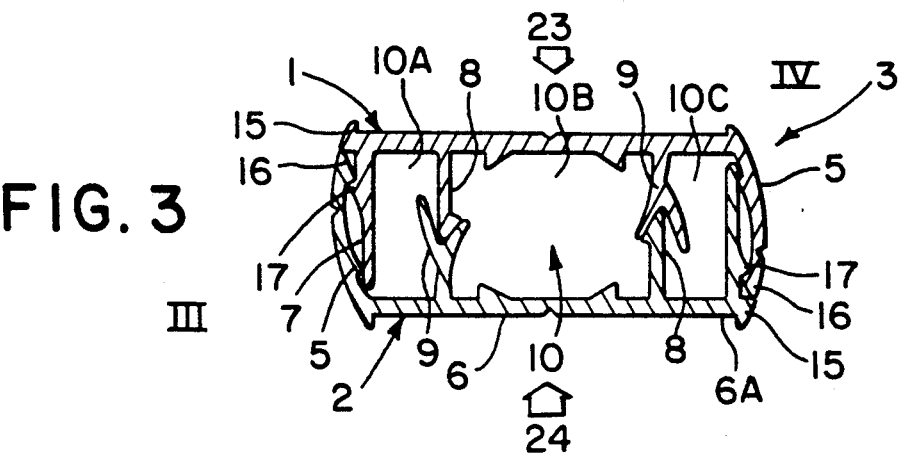
FIG. 3 shows a section through two assembled profile lengths.
Figure 4:
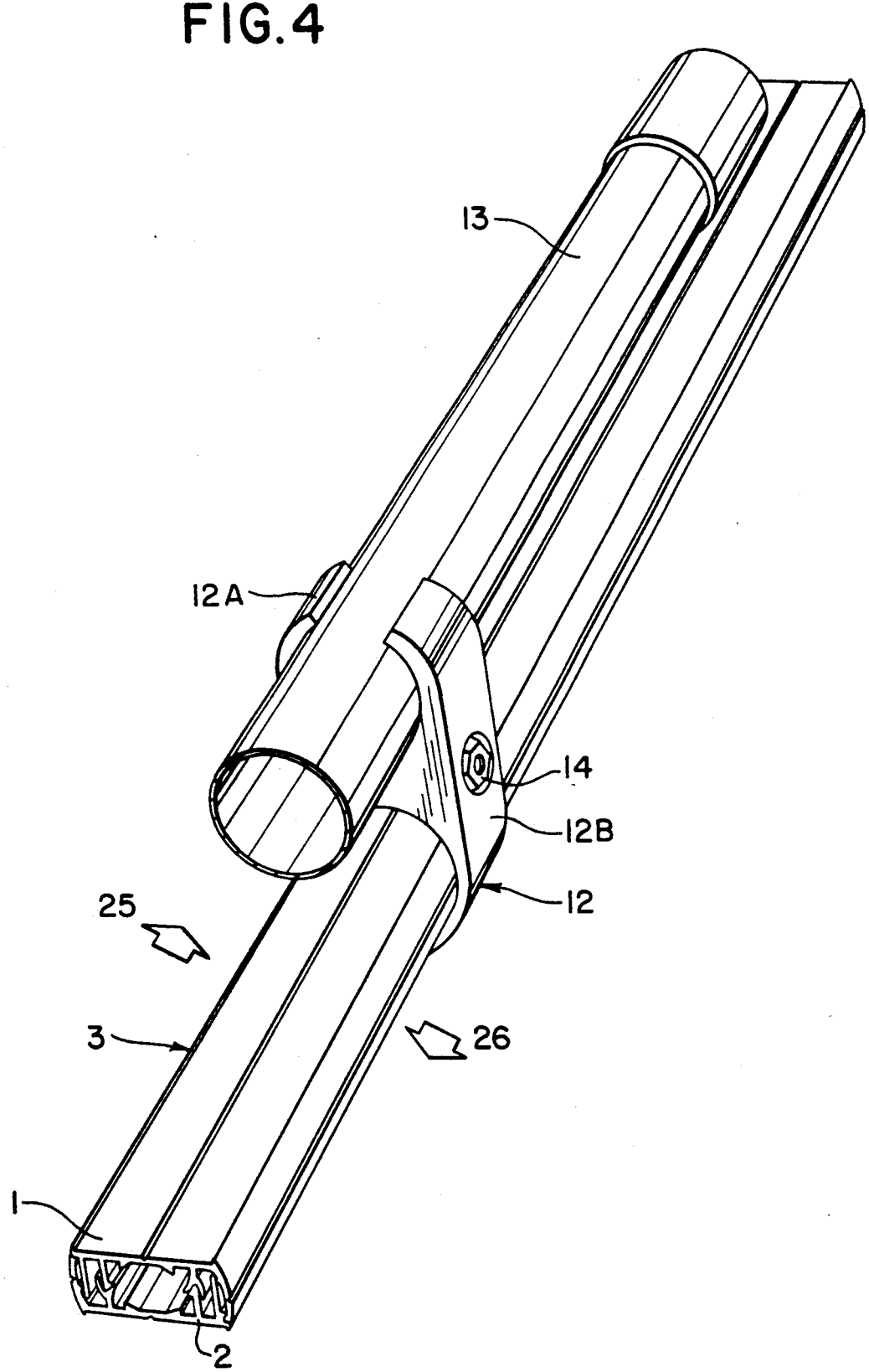
FIG. 4 shows a channel section attached to a support.
Figure 5:
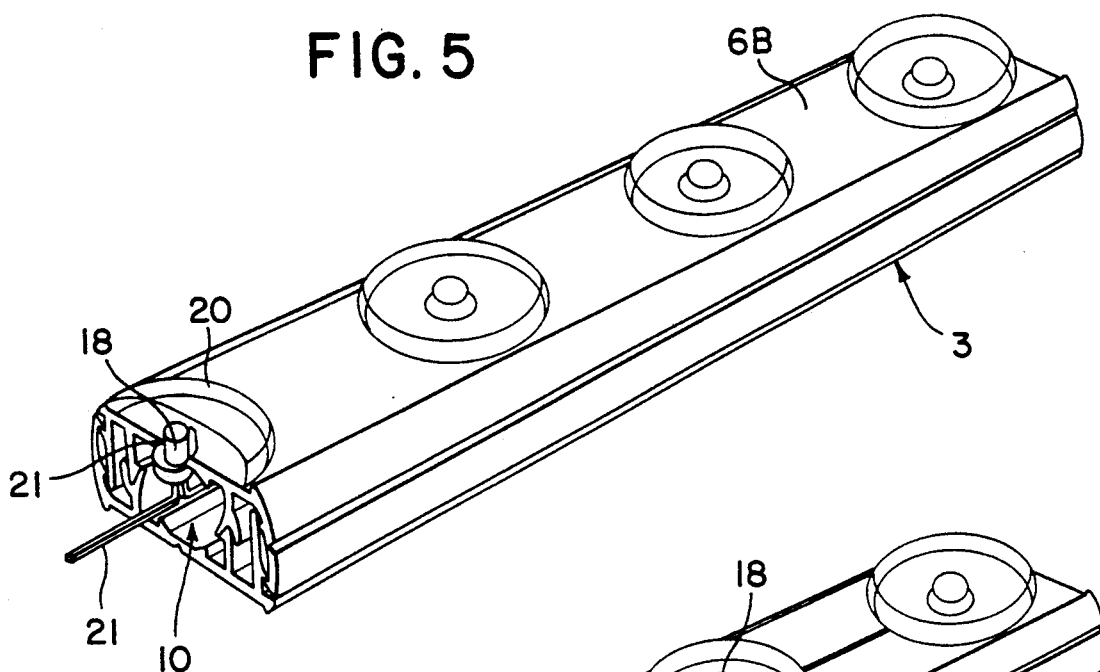
FIG. 5 shows a perspective view of a channel section incorporating LEDs.
Figure 6:
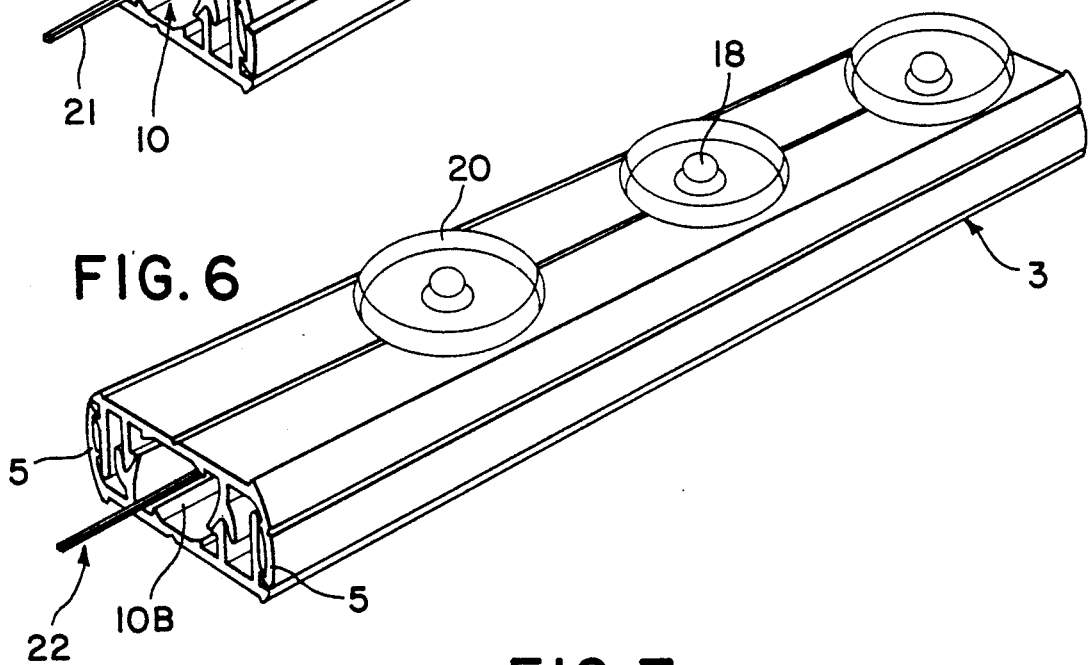
FIG. 6 shows a further example of a channel section fitted with LEDs, viewed at an angle from above.
Figure 7:
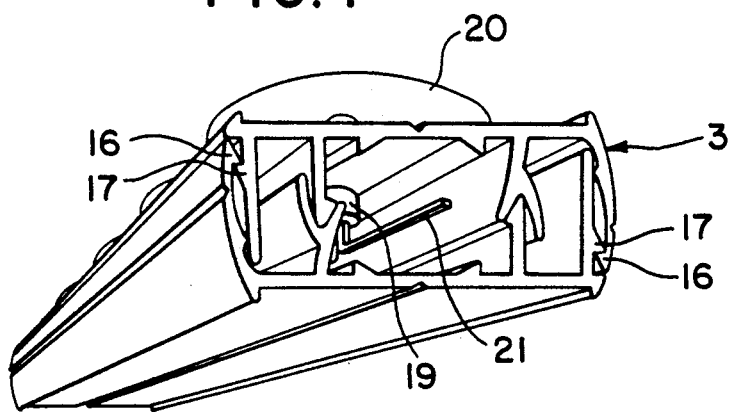
FIG. 7 shows said channel structure viewed at an angle from below.

So-called "open" profile lengths 1, 2, which can exhibit a desired length and can consist of aluminium or some other suitable metal, or even of a plastic material, and which are so arranged as to be capable of being connected together to produce a "closed" channel structure 3 along the effective external periphery of the profile lengths, comprise an arrangement 4 which permits two profile lengths 1, 2 of mutually identical execution to be connected together to produce a channel structure 3 of the aforementioned kind, thereby avoiding the need for the production and storage of profile lengths of different kinds. Said arrangement 4 involves each profile length 1, 2, which can be produced by a previously disclosed method, for example by extrusion, having its own external flange 5 with the desired external form which it is wished to impart to the assembled closed channel structure 3 and also a number of outgoing connecting elements 7, 8, 9 projecting from a common base 6 for the profile length.

Two mutually identical profile lengths 1, 2 are thus so arranged as to be capable of being connected together, in the positions I and II in which they are turned so that their channel-shaped spaces 10 face towards one another or at least face towards a common imaginary plane 11 situated between said two profile lengths 1, 2, through the interaction between said flanges and outgoing connecting elements 5, 7; 8, 9; 9, 8; 7, 5.

Said formed flange 5 may appropriately exhibit rounded form, as illustrated in the drawings, or may have some other angled form which deviates from straight form, intended to permit it to be connected to holders 12 so arranged as to engage around both the assembled channel structure 3 and a support 13, for example in the form of a tube, a post or a beam of some other kind. The holder 12 can be executed in the form of a divided holder 12A, 12B, which engages closely around the structure 3 and the support 13 to either side of a clamping bolt 14.

One end 6A of the base 6 of the profile lengths may appropriately exhibit a base flange 15, which is so arranged as to constitute an extension of the closely-fitting connecting flange 5 on the second profile length 1, 2.

One of said connecting elements can be constituted by an essentially straight flange 7, which can be accommodated in the space 10 within a closely-fitting connecting flange 5 in a complementary profile length 1, 2.

Arranged on the side 5A, 7A of each lateral flange are connecting devices 16, 17 which are capable of interacting with one another in pairs for the purpose of retaining the two profile lengths 1, 2 in question in the positions III, IV next to one another in relation to one another, and said connecting devices can appropriately be formed from an area of greater cross-section 16, 17 projecting laterally from the associated flange 5, 7, which area of greater cross-section extends for the desired distance in the longitudinal sense of the associated profile length.

A number of connecting elements 8, 9 on each profile length 1, 2, which project from the base 6 of each profile length, are so arranged as to divide the internal space 10 of the channel structure into a number of subsidiary spaces 10A, 10B, 10C extending in the longitudinal sense of the channel structure, the function of which will be described later.

Connecting elements 8, 9 can also be executed respectively as female 9 and male 8, strip-shaped components, as shown in the drawings.

Because of the essentially plane form exhibited by the external surface 6B of the base of the profile length facing away from the profile length, the profile length is able to accommodate LEDs 18 and a casing bracket 19 for a diode lens 20 in appropriate holes 21, so that the assembled channel structure 3 can be utilized for lighting applications, primarily as decorative lighting and/or boundary lighting. A previously disclosed diode arrangement may be found, for example, in SE Patent Application No. 8501110-4.

A wiring conductor 22 for said LEDs 18 can be arranged inside the internal space 10B of the channel structure, where it is accommodated in such a way as to extend along the structure for series and/or parallel connection as desired, and for connection to a suitable power supply and control unit, etc.

The connection of two profile lengths 1, 2 to one another is made possible either by their being moved in a direction 23, 24 towards one another and into a position in which they are turned so that their respective spaces 10A–10C face towards one another, such that the connecting devices 16, 17 engage behind one another and hold the assembled closed channel structure 3 together, or by their first being positioned slightly displaced from one another at the level at which it is intended that the two profile lengths 1, 2 should be connected together, whereupon they are displaced relative to one another in their longitudinal sense 25, 26, so that the connecting devices 16, 17 are situated behind one another without snapping, and so that the flanges 8, 9 are situated adjacent to one another in pairs.

Dismantling of the channel structure 3 is effected in the reverse sequence to that outlined above.

Said spaces 10A-10C in the structure 3 are able to function partly as an accommodating space for various conductors and other devices, although they also constitute an effective moisture barrier and thus effectively prevent dampness from finding its way in easily into the centre of the structure.

The invention is not restricted to the embodiment described above and illustrated in the drawings, but may be modified within the scope of the Patent Claims without departing from the idea of invention.

I claim:

1. Arrangement for a pair of open profile lengths (1, 2) forming a closed channel structure (3) comprising:
   first and second substantially identical profile lengths (1, 2),
   each profile length (1, 2) having a base (6) with a first and a second end (6A, 6B),
   an external flange (5) extending from said base (6),
   an outgoing connecting element (7) extending out from said base (6),
   a base flange (15) extending from said outgoing connecting element (7),
   a longitudinal connecting element device (17) projecting substantially perpendicular to and outward from said outgoing connecting element (7),
   a longitudinal connecting element device (16) projecting substantially perpendicular to and inward from said connecting element (5),
   said outgoing connecting element (15) of said first profile length (1) being engageable with said external flange (5) of said second profile length (2) by the interlocking of said connecting element devices (16, 17) engaging with each other,
   further comprising a longitudinal male (8) and a longitudinal female (9) connecting element disposed on each of said profile lengths (1, 2), said longitudinal male and longitudinal female elements (8, 9, respectively) projecting substantially perpendicular to said base (6) and being disposed between said external flange (5) and said outgoing connecting element (7), said longitudinal male and said longitudinal female elements (8, 9, respectively) of said first profile length (1) being engageable with the corresponding longitudinal female and longitudinal male elements (9, 8, respectively) of said second profile length (2), whereby, upon engagement of said first profile length (1) with said second profile length (2), a plurality of discrete longitudinal spaces (10A, 10B, 10C) are formed.

2. Arrangement for open profile lengths according to claim 1, wherein said external flange (5) is curved.

3. Arrangement for open profile lengths according to claim 1, wherein said external flange (5) is angled with respect to said base (6).

4. Arrangement for open profile lengths according to claim 1, wherein said base (6) has holes (21) for receiving light-emitting diodes (18), support brackets (19), or the like.

5. Arrangement for open profile lengths according to claim 1, wherein said longitudinal spaces (10A, 10B, 10C) are adapted to accommodate electrical conductors (22).

* * * * *